United States Patent [19]
Hamamoto et al.

[11] Patent Number: 5,308,569
[45] Date of Patent: May 3, 1994

[54] PROCESS FOR THE PREPARATION OF AROMATIC POLYIMIDE FILM

[75] Inventors: Toshikazu Hamamoto; Hiroshi Inoue; Yoshiyuki Miwa; Tetsuji Hirano, all of Osaka; Katsuo Imatani, Yamaguchi; Kenji Matsubara, Yamaguchi; Takashi Kohno, Yamaguchi, all of Japan

[73] Assignee: Ube Industries, Ltd., Yamaguchi, Japan

[21] Appl. No.: 798,532

[22] Filed: Nov. 26, 1991

[30] Foreign Application Priority Data

Nov. 27, 1990 [JP] Japan ................................ 2-32658
Nov. 27, 1990 [JP] Japan ................................ 2-326259

[51] Int. Cl.$^5$ ............................................. B29C 39/14
[52] U.S. Cl. ................................ 264/216; 264/204; 264/236; 264/331.21; 264/347; 264/331.19; 528/188; 528/353
[58] Field of Search ............... 264/204, 216, 331.21, 264/344, 345, 236, 347, 331.19; 528/125, 124, 188, 353; 525/420; 524/296, 297

[56] References Cited

U.S. PATENT DOCUMENTS

| | | | |
|---|---|---|---|
| 3,862,897 | 1/1975 | Gattus et al. | 264/216 |
| 4,358,581 | 11/1982 | Sutton, Jr. | 528/125 |
| 4,470,944 | 9/1984 | Asakura et al. | 264/216 |
| 4,473,523 | 9/1984 | Sasaki et al. | 264/204 |
| 4,687,611 | 8/1987 | Sroog | 264/204 |
| 4,797,307 | 1/1989 | Kunimoto et al. | 264/216 |
| 5,037,587 | 8/1991 | Saruwatari et al. | 264/216 |

*Primary Examiner*—Jeffery Thurlow
*Assistant Examiner*—Mathieu Vargot
*Attorney, Agent, or Firm*—McAulay Fisher Nissen Goldberg & Kiel

[57] ABSTRACT

A process for the preparation of an aromatic polyimide film includes the steps of casting a polyamide acid solution containing an imidization agent on a support in the form of a film, heating the filmy cast solution on the support at a temperature of 80° to 200° C. to obtain a self-supportable film; peeling the self-supportable film from the support; and further heating the film at a temperature of not lower than 300° C. The polyamide acid solution includes a polyamide acid obtained by polymerization reaction of 3,4,3',4'-biphenyltetracarboxylic dianhydride and p-phenylenediamine in a mixture of a polar organic solvent and a small amount of an imidization agent selected from imidazole, a substituted imidazole, benzimidazole, a substituted benzimidazole, isoquinoline, and a substituted pyridine.

6 Claims, No Drawings

PROCESS FOR THE PREPARATION OF AROMATIC POLYIMIDE FILM

FIELD OF THE INVENTION

This invention relates to a process for preparing an aromatic polyimide film from a polyamide acid obtained by polymerization reaction of 3,4,3',4'-biphenyltetracarboxylic dianhydride and p-phenylenediamine utilizing an imidization agent.

BACKGROUND OF THE INVENTION

Films of an aromatic polyimide obtained by polymerization-cyclization (i.e., polymerization-imidization) reaction of an aromatic tetracarboxylic anhydride and an aromatic diamine are excellent in heat resistance and chemical stability, so that they have been paid much attention as excellent industrial materials applicable to various uses. Particularly, a film of an aromatic polyimide obtained by polymerization reaction of 3,4,3',4'-biphenyltetracarboxylic dianhydride and p-phenylenediamine is known to have remarkably high heat resistance and chemical stability.

For the preparation of aromatic polyimide films, there has been conventionally utilized a process comprising the steps of polymerizing an aromatic tetracarboxylic dianhydride and an aromatic diamine in a polar organic solvent to prepare a solution of a polyamide acid (also referred to as "polyamic acid"), then casting the polyamide acid solution on a support in the form of a film, heating the filmy cast solution at a temperature of 80° to 200° C. to obtain a self-supportable film, then peeling the self-supportable film from the support, and subjecting the film to heating-cyclization (ring closure) by, for example, further heating the film at a temperature of not lower than 300° C. This process utilizing the heating-cyclization is simple and industrially advantageous, but has a problem that an amide acid bond of the polyamide acid is apt to be hydrolyzed owing to water produced in the cyclization reaction (imidization reaction) to cause reduction of molecular weight of the produced polymer, resulting in deterioration of physical properties of the resultant polyimide film.

For avoiding such problems as the above-mentioned deterioration of physical properties of the resultant film, there has been already developed a process using an imidization agent, namely, chemical imidization process. In that process, the imidization agent is added to the polyamide acid solution. In the presence of the imidization agent, hydrolysis of the amide acid bond is prevented and the cyclization (imidization) reaction can be performed by heat treatment at low temperatures, to obtain a polyimide film. As the imidization agent employable for this purpose, tertiary amines such as pyridine are conventionally known as described in "Polyamide Resin Handbook", edited by Osamu Fukumoto, published by Nikkan Kogyo Shim-bunsha, 1988, pp. 533-534. Pyridine is available at a low cost, so that it can be said that employment of pyridine is industrially advantageous. However, in the process using pyridine, it is essential to use a lower carboxylic acid anhydride such as acetic anhydride in combination therewith. Further, the pyridine is required to be used in an amount of not smaller than 0.5 mole per 1 mole of the amide acid bond of the polyamide acid. For these reasons, the employment of pyridine is not always advantageous in industrial use (see: Japanese Patent Provisional Publication No. 59(1984)-223725). Especially in the case of adding a heretofore employed tertiary amine and a lower carboxylic acid anhydride in combination to the polyamide acid solution for the purpose of chemical imidization, the solution is inavoidably converted into a gel in a short period of time, and thereby the subsequent essential steps for preparing a film such as a step of casting the solution is not smoothly conducted.

For coping with the problem of gelation, the aforementioned Japanese Patent Provisional Publication No. 59(1984)-223725 proposes that imidazole, benzimidazole or a derivative thereof be employed as a chemical imidization agent, without using the carboxylic acid anhydride in combination. However, problems still remain in this process. That is, imidazole, benzimidazole and derivatives thereof are relatively high in cost, and additionally, they are necessarily used in an amount of not less than 2 moles per 1 mole of the amide acid bond of the polyamide acid in order to perform imidization reaction so efficiently that the process is industrially advantageous.

SUMMARY OF THE INVENTION

It is an object of the present invention is to provide an industrially advantageous process for preparing a film of an aromatic polyimide from a polyamide acid obtained by polymerization reaction of 3,4,3',4'-biphenyltetracarboxylic dianhydride and p-phenylenediamine.

There is provided by the present invention a process for the preparation of an aromatic polyimide film comprising the steps of:

casting a polyamide acid solution on a support in the form of a film, said polyamide acid solution comprising a polyamide acid obtained by polymerization reaction of 3,4,3',4'-biphenyltetracarboxylic dianhydride and p-phenylenediamine in a mixture of a polar organic solvent other than a nitrogen atom-containing heterocyclic compound having a resonance structure and isoquiniline or a pyridine having a substituent, said isoquinoline or pyridine a substituted being used in an amount of 0.02 to 0.4 gram equivalent per 1 gram equivalent of an amide acid unit of the polyamide acid;

heating the cast solution on the support at a temperature of 80° to 200° C. to obtain a self-supportable film;

peeling the self-supportable film from the support; and heating the film at a temperature of not lower than 300° C.

There is further provided by the invention a process for the preparation of an aromatic polyimide film comprising the steps of:

casting a polyamide acid solution on a support in the form of a film, said polyamide acid solution comprising a polyamide acid obtained by polymerization reaction of 3,4,3',4'-biphenyltetracarboxylic dianhydride and p-phenylenediamine in a mixture of a polar organic solvent and an imidazole or benzimidazole which may have a substituent group, said imidazole or benzimidazole being used in an amount of 0.02 to 0.8 gram equivalent per 1 gram equivalent of an amide acid unit of the polyamide acid;

heating the filmy cast solution on the support at a temperature of 80° to 200° C. to obtain a self-supportable film;

peeling the self-supportable film from the support; and further heating the film at a temperature of not lower than 300° C.

According to the present invention, a polyimide film having excellent physical properties (particularly high tensile strength and high elongation) can be prepared, without occurrence of troubles such as gelation at an early stage (i.e., trouble of short pot time), from 3,4,3',4'-biphenyltetracarboxylic dianhydride and p-phenylenediamine using a small amount of isoquinoline, a substituted pyridine, imidazole, a substituted imidazole, benzimidazole or a substituted benzimidazole. Therefore, the process for preparing a polyimide film according to the invention is suitable particularly for continuous mass-production of an aromatic polyimide film.

DETAILED DESCRIPTION OF THE INVENTION

In the case of using a tertiary amine such as pyridine as a chemical imidization agent in the process for preparing a film of an aromatic polyimide by cyclization (imidization) of a polyamide acid obtained by polymerizing aromatic tetracarboxylic dianhydride and aromatic diamine, it is heretofore said that a lower carboxylic acid anhydride should be used in combination with the tertiary amine and that the amount of the tertiary amine should be not smaller than 0.5 mole per 1 mole of an amide acid bond of the polyamide acid. However, it has been found by the present inventors that the film of an aromatic polyimide can be industrially advantageously prepared by using an extremely small amount of isoquinoline or a substituted pyridine as a chemical imidization agent and using no lower carboxylic acid anhydride. In more detail, in the case of using 3,4,3',4'-biphenyltetracarboxylic dianhydride as the aromatic tetracarboxylic anhydride and using p-phenylenediamine as the aromatic diamine, if isoquinoline or a substituted pyridine is used in an amount of 0.02 to 0.4 gram equivalent per 1 gram equivalent of an amide acid unit of the produced polyamide acid to perform imidization reaction, gelation of the polyamide acid solution at early stage that causes trouble in the industrial preparation of the aromatic polyimide film does not occur, chemical imidization reaction proceeds at a satisfactory rate even under conventional conditions, and the resulting aromatic polyimide film shows high mechanical strength.

Further, in the case of using imidazole, benzimidazole or a derivative thereof as a chemical imidization agent in the process for preparing a film of an aromatic polyimide by cyclization (imidization) of a polyamide acid obtained by polymerizing aromatic tetracarboxylic dianhydride and aromatic diamine, it is heretofore said that the amount thereof preferably is not smaller than 2 moles per 1 mole of an amide acid bond of the polyamide acid. However, it has been found by the present inventors that the film of an aromatic polyimide can be industrially advantageously prepared by using an extremely small amount of the above-mentioned chemical imidization agent. That is, in the case of using 3,4,3',4'-biphenyltetracarboxylic dianhydride as the aromatic tetracarboxylic anhydride and using p-phenylenediamine as the aromatic diamine, if imidazole, benzimidazole or a substituted derivative thereof is used in an amount of 0.02 to 0.8 gram equivalent per 1 gram equivalent of an amide acid unit of the produced polyamide acid to perform imidization reaction, gelation of the polyamide acid solution at early stage that causes trouble in the industrial preparation of the aromatic polyimide film does not occur, chemical imidization reaction proceeds at a satisfactory rate even under conventional conditions, and the resulting aromatic polyimide film shows high mechanical strength.

In the invention, 3,4,3',4'-biphenyltetracarboxylic dianhydride may be used in combination with other reactive aromatic tetracarboxylic acids or derivatives thereof. The compounds employable in combination with the 3,4,3',4'-biphenyltetracarboxylic dianhydride are generally used in an amount of not more than 10 molar %, preferably not more than 5 molar %, of the total amount of the tetracarboxylic acid component. Examples of the compounds employable in combination therewith are dianhydrides of tetracarboxylic acids such as 2,3,3',4'-biphenyltetracarboxylic acid, 3,3',4,4'-benzophenonetetracarboxylic acid, pyromellitic acid, bis(3,4-dicarboxyphenyl)methane and bis(3,4-dicarboxyphenyl)ether.

Further, p-phenylenediamine can be used in combination with other aromatic diamines. The compounds employable in combination with p-phenylenediamine are generally used in an amount of not more than 20 molar %, preferably not more than 15 molar %, of the total amount of the aromatic diamine component. Examples of the compounds employable in combination therewith include m-phenylenediamine, 4,4'-diaminodiphenylether, 4,4'-diaminodiphenylthioether, 4,4'-diaminodiphenylmethane and 4,4'-diaminodiphenylsulfone.

A process for preparing a polyamide acid from 3,4,3',4'-biphenyltetracarboxylic dianhydride and p-phenylenediamine is already known as described above. In more detail, 3,4,3',4'-biphenyltetracarboxylic dianhydride and p-phenylenediamine are used in an amount of essentially the same mole, and they are polymerized in a polar organic solvent at 0° to 80° C., preferably 0° to 70° C., to obtain a polyamide acid. As the polar organic solvent used in the polymerization reaction, there can be mentioned organic solvents having high dissolving power for the aromatic polyamide acid, such as N-methyl-2-pyrrolidone, pyridine, quinoline, N,N-dimethylacetamide, dimethylsulfoxide, tetramethylurea, cresol and phenol.

In the invention, the polyamide acid solution which is cast on a support in the form of a film to give a cast solution film may be the above-mentioned reaction solution (i.e., reaction solution obtained by the condensation polymerization reaction) itself, a concentrated solution of the reaction solution or a dilute solution of the reaction solution. Otherwise, the polyamide acid solution may be a solution obtained by temporarily taking out a produced polyamide acid from the reaction solution and then again dissolving the polyamide acid in an appropriate polar organic solvent.

If isoquinoline or a substituted pyridine is used as the solvent for the polymerization reaction, a whole amount or almost whole amount of such solvent should be removed prior to initiation of the imidization reaction so that a large amount of such solvent is not present in the solvent for imidization reaction.

The polyamide acid preferably has a high molecular weight and has a logarithmic viscosity (measured at 30° C. at concentration of 0.5 g/100 ml (acid/solvent)) of not less than 0.1, and more preferably has a high molecular weight and has a logarithmic viscosity of 0.2 to 5. The term "logarithmic viscosity" means a value (($\ln \kappa_{rel}$)/c) obtained by dividing a natural logarithm of a relative viscosity ($\kappa_{rel}$) by a concentration (c).

The concentration of the polyamide acid (i.e., polymer concentration) in the polyamide acid solution for preparing the filmy cast solution is generally in the range of 3 to 40% by weight, preferably in the range of 4 to 35% by weight.

To the polyamide acid solution prepared as above is added isoquinoline or a substituted pyridine in such small amount as an amount of approx. 0.02 to 0.4 gram equivalent per 1 gram equivalent of an amide acid unit of the polyamide acid. The substituted pyridine typically is a pyridine having one or two lower alkyl groups (having 1 to 6 carbon atoms) such as 3,5-dimethylpyridine, 3,4-dimethylpyridine, 2,5-dimethylpyridine, or 4-n-propylpyridine. The imidization agent can be used singly or in combination of two or more kinds.

Othewise, to the polyamide acid solution prepared as above is added imidazole, benzimidazole or a substituted derivative thereof in such small amount as an amount of approx. 0.02 to 0.8 gram equivalent per 1 gram equivalent of an amide acid unit of the polyamide acid. Examples of the substituted derivatives include imidazoles and benzimidazoles having one or two lower alkyl groups, such as N-methylimidazole, N-benzyl-2-methylimidazole, 2-methylimidazole, 2-ethyl-4-methylimidazole and 5-methyl-benzimidazole. These imidization agents can be used in combination of two or more kinds.

The above-mentioned isoquinoline, a substituted pyridine, imidazole, a substituted imidazole, benzimidazole or a substituted benzimidazole functions independently as a chemical imidization agent of the polyamide acid which is obtained by polymerization reaction of 3,4,3',4'-biphenyltetracarboxylic dianhydride and p-phenylenediamine in the invention. However, the chemical imidization agent is required to be used in a very small amount such as an amount of approx. 0.02 to 0.4 gram equivalent per 1 gram equivalent of an amide acid unit of the polyamide acid in the use of isoquinoline or a substituted pyridine as the imidization agent, and an amount of approx. 0.02 to 0.8 gram equivalent per 1 gram equivalent of an amide acid unit of the polyamide acid in the use of imidazole, benzimidazole or a derivative thereof as the imidization agent. In the use of isoquinoline or a substituted pyridine, the amount preferably is in the range of 0.05 to 0.3 gram equivalent, more preferably in the range of 0.1 to 0.2 gram equivalent, per 1 gram equivalent of an amide acid unit of the polyamide acid. In the use of imidazole, benzimidazole, or a derivative thereof, the amount preferably is in the range of 0.05 to 0.5 gram equivalent, more preferably in the range of 0.1 to 0.3 gram equivalent, per 1 gram equivalent of an amide acid unit of the polyamide acid. Preferably, the chemical imidization agent is used without using a lower carboxylic acid anhydride in combination.

Employment of the lower carboxylic acid anhydride in combination with the imidization agent may show certain good effect in improvement of the imidization rate, but adverse effect such as acceleration of gelation of the polyamide acid solution sometimes takes place, so that employment of such combination may be harmful in the industrial preparation of an aromatic polyimide film according to the invention.

The polyamide acid solution obtained as above is subjected to various treatments such as defoaming and filtration, if necessary. Then, the solution is cast in the form of a film on a heat-resistant support such as a glass plate, a metal plate, a metal belt or a metal drum using a T-die, a doctor knife or the like, to form a layer of the solution having a thickness of 50 to 2,000 μm on the support. Thereafter, the filmy cast solution on the support is heated at a temperature of 80° to 200° C. in a heating apparatus which utilizes a hot air, infrared rays or the like, to obtain a self-supportable film. By this heating, the self-supportable film shows loss in weight on heating of 25–45% by weight, and some imidization reaction takes place. Thus, a polymer having an imidization ratio of 25–80% (particularly, 25–60%) is obtained. The loss in weight on heating means a weight loss after the self-supportable film is heated at 420° C. for 20 minutes, and is a value obtained by the following formula:

Loss in weight on heating (wt. %) = 100 × {(Sample weight before heating−Sample weight after heating)/(Sample weight before heating)}

The self-supportable film is then peeled from the support, and the film is further heated at a temperature of not lower than 300° C. (generally not lower than 450° C.), to obtain an aimed aromatic polyimide film having an imidization ratio of approx. 100%. This heating of the self-supportable film is conducted by conventional heating methods such as a method of allowing the film to pass between plural heating rolls or a method of heating the film under application of certain tension to the film by holding both ends of the film with clips or pins.

Examples of the invention and comparison examples are given below.

In those examples, the imidization ratio is a value obtained as follows. An absorbance ratio of a characteristic absorption of an imide group at 740 cm$^{-1}$ or 1,780 cm$^{-1}$ to an absorption of a phenyl group as internal reference at 1,510 cm$^{-1}$ is determined by calculation according to a method of using infrared absorption spectrum (ATR method). Separately, the absorbance with respect to a polyimide film having an imidization ratio of 100% is also determined by calculation. Then, a ratio of the former absorbance to the latter absorbance is calculated, and the obtained ratio is expressed in terms of percentage (%).

The gelation time is expressed by a period of time at the end of which roping of the polyamide acid solution at 30° C. is not observed.

The tensile strength and the elongation of each polyimide film are measured at room temperature (25° C.).

EXAMPLE 1

In 423.76 g of N,N-dimethylacetamide was dissolved 25.00 g (0.2312 mole) of p-phenylenediamine, and to the resulting solution was portionwise added 68.02 g (0.2312 mole) of 3,4,3',4'-biphenyltetracarboxylic dianhydride for 1 hour. During this addition procedure, the temperature of the solution was kept at approx. 60° C. Thus, a polyamide acid solution (logarithmic viscosity of polymer=2.2) having a polymer concentration [P] of 18.0 wt. % and a solution viscosity (measured at 35° C. using B-type rotational viscometer) of 1,200 poise was obtained.

To 50 g of the obtained polyamide acid solution were added 5.528 g of N,N-dimethylacetamide and 0.7223 g (5.592×10$^{-3}$ mole) of isoquinoline, and they were stirred and mixed with each other for 3 minutes. In the resulting mixture solution, the equivalent ratio of an amide acid unit of the polyamide acid to isoquinoline was 1/0.125 (amide acid unit/isoquinoline), and the polymer concentration [P] was 16.0 wt. %. When the mixture solution was allowed to stand for 1 day at 30° C., no gelation of the solution was observed.

The mixture solution of polyamide acid and isoquinoline was evenly cast on a glass plate using a doctor knife to form a layer of the solution having a thickness of approx. 780 μm. The cast solution layer on the glass plate was dried by applying a hot air of 140° C. for 10 minutes in a hot-air drying oven, to obtain a self-supportable film (loss in weight on heating: 32 wt. %) having an imidization ratio of 29% with respect to a polymer on the glass plate side surface.

Subsequently, the self-supportable film was fixed to a metal frame. The film with the metal frame was placed in a hot-air drying oven and heated with a hot air in the oven for 10 minutes at 180° C., then another 5 minutes at 300° C. and further 5 minutes at 420° C., to obtain a polyimide film (imidization ratio: 100%) having a thickness of approx. 60 μm.

The tensile strength of the obtained polyimide film was 41 kg/mm$^2$, and its elongation was 43%.

EXAMPLE 2

The procedures of Example 1 were repeated except for using 4-n-propylpyridine in place of isoquinoline in the same molar amount ($5.592 \times 10^{-3}$ mole, 0.68 g), to obtain a polyimide film (imidization ratio: 100%) having a thickness of approx. 60 μm.

The tensile strength of the obtained polyimide film was 44 kg/mm$^2$, and its elongation was 45%.

The self-supportable film obtained in the course of the process showed loss in weight on heating of 31% and imidization ratio of 31% with respect to a polymer on the glass plate side surface.

EXAMPLE 3

The procedures of Example 1 were repeated except for using 3,4-dimethylpyridine in place of isoquinoline in the same molar amount ($5.592 \times 10^{-3}$ mole, 0.60 g), to obtain a polyimide film (imidization ratio: 100%) having a thickness of approx. 60 μm.

The tensile strength of the obtained polyimide film was 40 kg/mm$^2$, and its elongation was 43%.

The self-supportable film obtained in the course of the process showed loss in weight on heating of 32% and imidization ratio of 32% with respect to a polymer on the glass plate side surface.

EXAMPLE 4

The procedures of Example 1 were repeated except for using 3,5-dimethylpyridine in place of isoquinoline in the same molar amount ($5.592 \times 10^{-3}$ mole, 0.60 g), to obtain a polyimide film (imidization ratio: 100%) having a thickness of approx. 60 μm.

The tensile strength of the obtained polyimide film was 43 kg/mm$^2$, and its elongation was 45%.

The self-supportable film obtained in the course of the process showed loss in weight on heating of 32% and imidization ratio of 28% with respect to a polymer on the glass plate side surface.

EXAMPLE 5

The procedures of Example 1 were repeated except for using 2,3-dimethylpyridine in place of isoquinoline in the same molar amount ($5.592 \times 10^{-3}$ mole, 0.60 g), to obtain a polyimide film (imidization ratio: 100%) having a thickness of approx. 60 μm.

The tensile strength of the obtained polyimide film was 45 kg/mm$^2$, and its elongation was 46%.

The self-supportable film obtained in the course of the process showed loss in weight on heating of 31% and imidization ratio of 32% with respect to a polymer on the glass plate side surface.

EXAMPLE 6

The procedures of Example 1 were repeated except for using isoquinoline in a twice amount ($11.18 \times 10^{-3}$ mole, 1.45 g), to obtain a polyimide film (imidization ratio: 100%) having a thickness of approx. 60 μm.

The tensile strength of the obtained polyimide film was 42 kg/mm$^2$, and its elongation was 43%.

The self-supportable film obtained in the course of the process showed loss in weight on heating of 30% and imidization ratio of 35% with respect to a polymer on the glass plate side surface.

EXAMPLE 7

In 423.76 g of N,N-dimethylacetamide was dissolved 25.00 g (0.2312 mole) of p-phenylenediamine, and to the resulting solution was portionwise added 68.02 g (0.2312 mole) of 3,4,3',4'-biphenyltetracarboxylic dianhydride for 1 hour. During this addition procedure, the temperature of the solution was kept at approx. 60° C. Thus, a polyamide acid solution (logarithmic viscosity of polymer=2.2) having a polymer concentration [P] of 18.0 wt. % and a solution viscosity (measured at 35° C. using B-type rotational viscometer) of 1,200 poise was obtained.

To 50 g of the obtained polyamide acid solution were added 5.790 g of N,N-dimethylacetamide and 0.46 g ($5.592 \times 10^{-3}$ mole) of N-methylimidazole, and they were stirred and mixed with each other for 3 minutes. In the resulting mixture solution, the equivalent ratio of an amide acid unit of the polyamide acid to N-methylimidazole was 1/0.125 (amide acid unit/N-methylimidazole), and the polymer concentration [P] was 16.0 wt. %. When the mixture solution was allowed to stand for 1 day at 30° C., gelation of the solution was not observed.

The mixture solution of polyamide acid and N-methylimidazole was evenly cast on a glass plate using a doctor knife to form a layer of the solution having a thickness of approx. 780 μm. The cast solution layer on the glass plate was dried by applying a hot air of 140° C. for 10 minutes in a hot-air drying oven, to obtain a self-supportable film (loss in weight on heating: 32 wt. %) having an imidization rate of 30% with respect to a polymer on the glass plate side surface.

Subsequently, the self-supportable film was fixed to a metal frame. The film with the metal frame was placed in a hot-air drying oven and heated with a hot air in the oven for 10 minutes at 180° C., then another 5 minutes at 300° C. and further 5 minutes at 420° C., to obtain a polyimide film (imidization ratio: 100%) having a thickness of approx. 60 μm.

The tensile strength of the obtained polyimide film was 43 kg/mm$^2$, and its elongation was 45%.

EXAMPLE 8

The procedures of Example 7 were repeated except for using N-benzyl-2-methylimidazole in place of N-methylimidazole in the same molar amount ($5.592 \times 10^{-3}$ mole, 0.89 g), to obtain a polyimide film (imidization ratio: 100%) having a thickness of approx. 60 μm.

The tensile strength of the obtained polyimide film was 42 kg/mm$^2$, and its elongation was 44%.

The self-supportable film obtained in the course of the process showed loss in weight on heating of 31% and imidization ratio of 32% with respect to a polymer on the glass plate side surface.

EXAMPLE 9

The procedures of Example 7 were repeated except for using N-methylimidazole in the amount of twice (11.18×10$^{-3}$ mole, 0.92 g) of that used in Example 1, to obtain a polyimide film (imidization ratio: 100%) having a thickness of approx. 60 μm.

The tensile strength of the obtained polyimide film was 43 kg/mm$^2$, and its elongation was 45%.

The self-supportable film obtained in the course of the process showed loss in weight on heating of 31% and imidization rate of 38% with respect to a polymer on the glass plate side surface.

COMPARISON EXAMPLE 1

The procedures of Example 1 were repeated except for not adding isoquinoline to the polyamide acid solution, to obtain a polyimide film having a thickness of approx. 60 μm.

The tensile strength of the obtained polyimide film was 38 kg/mm$^2$, and its elongation was a low value of 35%.

The self-supportable film obtained in the course of the process showed loss in weight on heating of 35% and imidization ratio of 17% with respect to a polymer on the glass plate side surface.

COMPARISON EXAMPLE 2

The procedures of Example 1 were repeated except for using pyridine instead of isoquinoline in the same molar amount (5.592×10$^{-3}$ mole, 0.47 g), to obtain a polyimide film having a thickness of approx. 60 μm.

The tensile strength of the obtained polyimide film was 37 kg/mm$^2$, and its elongation was a low value of 36%.

The self-supportable film obtained in the course of the process showed loss in weight on heating of 33% and imidization ratio of 19% with respect to a polymer on the glass plate side surface.

COMPARISON EXAMPLE 3

The procedures of Example 1 were repeated except for using triethylamine in place of isoquinoline in the same molar amount (5.592×10$^{-3}$ mole, 0.57 g), to obtain a polyimide film having a thickness of approx. 60 μm.

The tensile strength of the obtained polyimide film was 28 kg/mm$^2$, and its elongation was a low value of 17%.

The self-supportable film obtained in the course of the process showed loss in weight on heating of 33% and imidization ratio of 20% with respect to a polymer on the glass plate side surface.

COMPARISON EXAMPLE 4

To 50 g of the polyamide acid solution obtained in Example 1 were added 3.818 g of N,N-dimethylacetamide, 0.7223 g (5.592×10$^{-1}$ mole) of isoquinoline, and 1.71 g (1.678×10$^{-1}$ mole) of acetic anhydride, and they were stirred and mixed with each other for 3 minutes. In the resulting mixture solution, the equivalent ratio of an amide acid unit of the polyamide acid and isoquinoline to acetic anhydride was 1/0.125/0.375 (amide acid unit/isoquinoline/acetic anhydride), and the polymer concentration [P] was 16.0 wt. %. When the mixture solution was allowed to stand at 30° C., gelation of the solution was observed within 0.5 hour.

We claim:

1. A process for the preparation of an aromatic polyimide film comprising the steps of:

casting a polyamide acid solution on a support in the form of a film, said polyamide acid solution comprising a polyamide acid obtained by the polymerization reaction of 3,4,3',4'-biphenyltetracarboxylic dianhydride and p-phenylenediamine in a polar organic solvent other than a nitrogen atom-containing heterocyclic compound having a resonance structure in the presence of an imidization agent selected from the group consisting of isoquinoline and a substituted pyridine, said imidization agent being used in an amount of 0.02 to 0.4 gram equivalent per 1 gram equivalent of an amide acid unit of the poly-amide acid and in the absence of a lower fatty acid anhydride;

heating the cast solution on the support at a temperature of 80° to 200° C. to obtain a self-supportable film;

peeling the self-supportable film from the support; and heating the film at a temperature of not lower than 300° C.

2. A process for the preparation of an aromatic polyimide film comprising the steps of:

casting a polyamide acid solution on a support in the form of a film, said polyamide acid solution comprising a polyamide acid obtained by polymerization reaction of 3,4,3',4'-biphenyltetracarboxylic dianhydride and p-phenylenediamine in a polar organic solvent in the presence of an imidization agent selected from the group consisting of imidazole, substituted imidazole, benzimidazole, and substituted benzimidazole, said imidization agent being used in an amount of 0.02 to 0.8 gram equivalent per 1 gram equivalent of an amide acid unit of the polyamide acid and in the absence of a lower fatty acid anhydride;

heating the cast solution on the support at a temperature of 80° to 200° C. to obtain a self-supportable film;

peeling the self-supportable film from the support; and heating the film at a temperature of not lower than 300° C.

3. The process for the preparation of an aromatic polyimide film as defined in claim 1, wherein the substituted pyridine is selected from the group consisting of 3,5-dimethylpyridine, 3,4-dimethylpyridine, 2,5-dimethylpyridine, and 4-n-propylpyridine.

4. The process for the preparation of an aromatic polyimide film as defined in claim 1, wherein the imidization agent is used in an amount within the range of 0.05 to 0.3 gram equivalent per 1 gram equivalent of an amide acid unit of the polyamide acid.

5. The process for the preparation of an aromatic polyimide film as defined in claim 2, wherein the substituted imidazole or benzimidazole is selected from the group consisting of N-methylimidazole, N-benzyl-2-methylimidazole, 2-methylimidazole, 2-ethyl-4-methylimidazole and 5-methylbenzimidazole.

6. The process for the preparation of an aromatic polyimide film as defined in claim 2, wherein the imidization agent is used in an amount within the range of 0.05 to 0.5 gram equivalent per 1 gram equivalent of an amide acid unit of the polyamide acid.

* * * * *

UNITED STATES PATENT AND TRADEMARK OFFICE
CERTIFICATE OF CORRECTION

PATENT NO. : 5,308,569
DATED : May 3, 1994
INVENTOR(S) : Toshikazu Hamamoto, et al It is certified that error appears in the above-identified patent and that said Letters Patent is hereby corrected as shown below:

On Title Page

Foreign Application Priority Data

```
[30]   Nov. 27, 1990  [JP]    JAPAN ....................2-326258
       Nov. 27, 1990  [JP]    JAPAN ....................2-326259
```

Signed and Sealed this

Second Day of August, 1994

Attest:

BRUCE LEHMAN

Attesting Officer    Commissioner of Patents and Trademarks